Nov. 22, 1938.　　　　E. E. LIBMAN　　　　2,137,847
STEERING MOVING CRAFT
Filed May 16, 1936
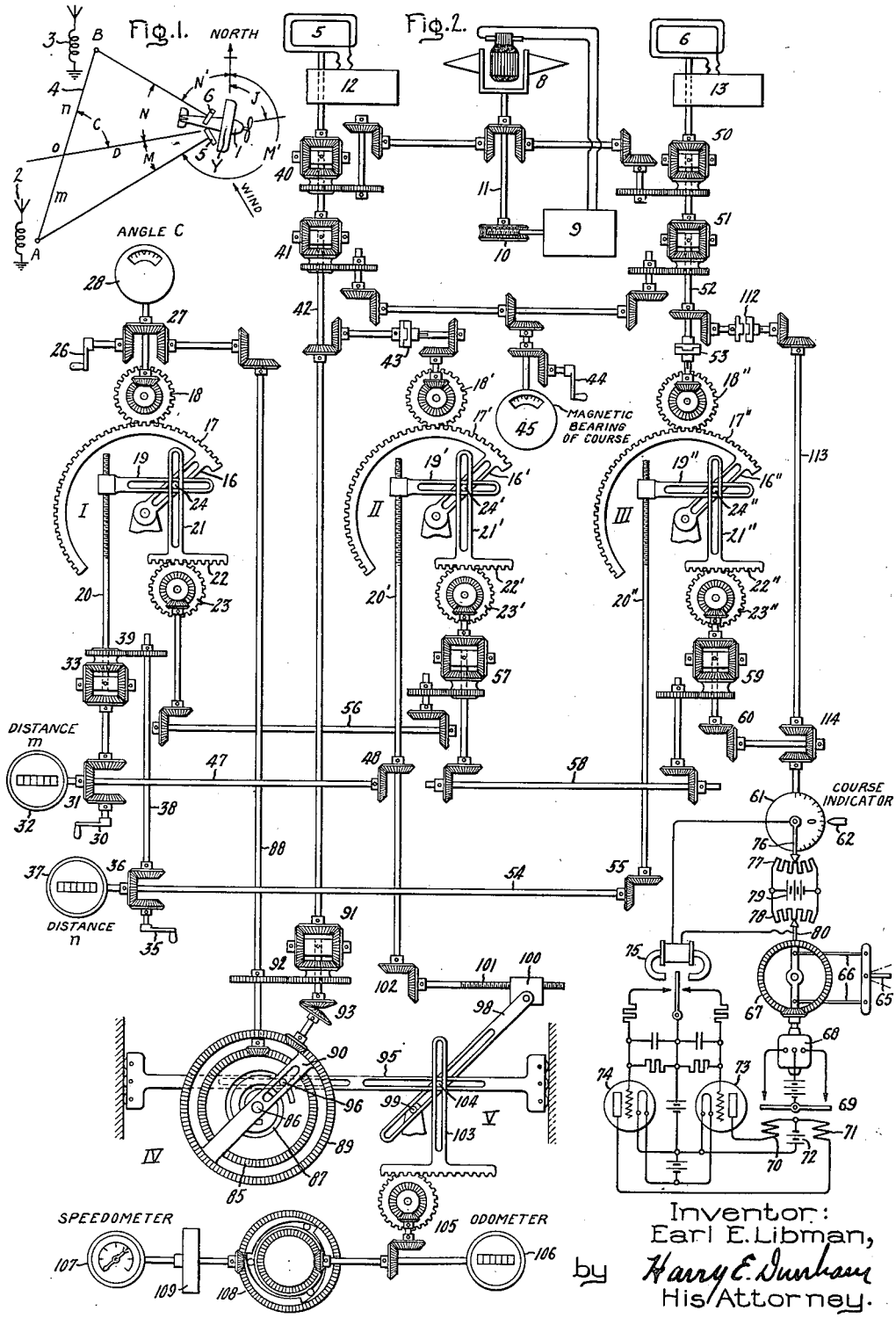
Inventor:
Earl E. Libman,
by Harry E. Dunham
His Attorney.

Patented Nov. 22, 1938

2,137,847

UNITED STATES PATENT OFFICE 2,137,847

STEERING MOVING CRAFT

Earl E. Libman, Schenectady, N. Y., assignor to General Electric Company, a corporation of New York Application May 16, 1936, Serial No. 80,100

11 Claims. (Cl. 250—11)

My invention relates to moving craft, such as air and water craft, and particularly to the navigation of such craft on a predetermined straight course.

In the Becker Patent 1,958,259, May 8, 1934, there is disclosed a system for steering moving craft on a straight course by the use of radio receiving apparatus carried by the craft. In that patent the radio transmitter to whose waves the receiving apparatus responds must be located on the line of the course. One object of my invention is to provide an improved system of steering a craft on a straight course by the use of radiant energy, such as radio waves, which may be transmitted to the craft from points which are not located on the line of the course. Another object of my invention is to provide means cooperating in said system for measuring the distance traveled by the craft and the speed thereof.

In accordance with my invention I employ a plurality of sources of radiant energy which are located laterally of the course that is on the same or on opposite sides thereof and I provide the craft with suitable radiant energy receiving apparatus therefor including directive receptors each arranged to be oriented with respect to one of said sources to receive the energy therefrom. The line connecting two sources makes an angle with the course which is known and the distances measured on this line between the course and the sources also are known. As the craft travels on the course the angles formed by the course and the receptors continuously vary. I have found that the relation of these angles and the above-mentioned known quantities may be expressed as an equation of which one side is zero as long as the craft is on the course. By continuously solving the equation as the variable angles given by the directive receptors change, the pilot knows if the craft has deviated from the course, and if it has he knows how to steer it to make proper correction for the deviation. Moreover, if desired, apparatus responsive to the solution of the equation may be employed to steer the craft automatically to maintain it on the course. The continuous angular change of one of the receptors forming a part of the system also is employed in effecting a measurement of the distance traveled by the craft and the speed thereof.

My invention will be better understood from the following description taken in connection with the accompanying drawing, and its scope will be pointed out in the appended claims.

Referring to the drawing, Fig. 1 is a diagram showing one relative arrangement of the course, the sources of radiant energy and the craft; Fig. 2 is a diagram of a form of apparatus which may be employed constantly to indicate whether or not the craft is on the course, to steer the craft automatically to keep it on the course and to indicate the distance travelled by the craft and the speed thereof.

In Fig. 1 I have represented the craft, such as an airplane, at 1 which it is desired to have travel on the straight course represented by the line D, which line makes the angle J with the magnetic north, the direction of the wind being represented by an arrow. At the points A and B which in the present case are shown located on opposite sides of the course D are two sources of radiant energy, such for example as radio transmitters operating on different frequencies. These transmitters are represented diagrammatically at 2 and 3 respectively. The line 4 connecting the two transmitters intersects the course D at the point $o$ and makes an angle with the course D which is known and which is represented by C. The distances between the points A and B occupied by the transmitters and the course as measured on the connecting line 4 are known and are represented respectively by $m$ and $n$.

If for convenience we let D represent the distance on the course from the point $o$ to the point Y, occupied by the craft at any instant, let A and B represent respectively the angles at points A and B, let $m$ and $n$ represent $oA$ and $oB$ respectively and let M and N represent respectively the angles at Y opposite $m$ and $n$, then $$\frac{D}{\sin A} = \frac{m}{\sin M} \quad (1)$$

and $$\frac{D}{\sin B} = \frac{n}{\sin N} \quad (2)$$

Since $$A = C - M \quad (3)$$

and $$B = 180 - (C + N) \quad (4)$$

Substituting in (1)

$$\frac{D}{\sin (C-M)} = \frac{m}{\sin M} \quad (5)$$

and in (2)

$$\frac{D}{\sin (C+N)} = \frac{n}{\sin N} \quad (6)$$

Then from (5) and (6)

$$D = \frac{m \sin (C-M)}{\sin M} = \frac{n \sin (C+N)}{\sin N} \quad (7)$$

Hence $$\frac{m}{\sin M}(\sin C \cos M - \cos C \sin M) =$$
$$\frac{n}{\sin N}(\sin C \cos N + \cos C \sin N) \quad (8)$$

and $$m(\sin C \cot M - \cos C) = n(\sin C \cot N + \cos C) \quad (9)$$

and $$\sin C(m \cot M - n \cot N) = \cos C(m+n) \quad (10)$$

and $$\cot C - \frac{m \cot M - n \cot N}{m+n} = 0 \quad (11)$$

also $$(m+n) \cot C - m \cot M + n \cot N = 0 \quad (12)$$

From Equation 12 above it will be seen that for every point Y on the line D the equation is satisfied, hence if the values of the various quantities comprising the left hand side of this equation are substituted therein and the algebraic sum thereof equals zero, the pilot knows that his craft is on the course. If the craft deviates to one side of the course the left side of the equation no longer will equal zero but will equal some positive quantity depending upon the amount of the deviation; likewise if the craft deviates to the other side of the course the left side of the equation will equal some negative quantity dependent upon the amount of the deviation. Apparatus for continuously solving Equation 12 provided with means for initially setting into it the known quantities and for continuously feeding into it the variable quantities may be provided with an indicator by which the pilot may know when the equation is satisfied and if not satisfied whether the craft has deviated, due to drift or other causes, to the right or to the left of the course. The craft moreover may be provided with means controlled by such apparatus for automatically steering it so as to cause the craft to travel on the straight course compensating for drift or other factors which may cause it to deviate therefrom. Furthermore, the craft may be provided with means controlled by the apparatus for indicating the distance traveled by the craft and the speed thereof.

The craft 1, see Fig. 1, is provided with a plurality of radio receivers each tuned to the frequency of one of the two transmitters 2 and 3 and each provided with a directive receptor having means whereby it is automatically maintained oriented with respect to the transmitter to the frequency of which the corresponding receiver is tuned. These directive receptors are represented as antennae in the form of loops 5 and 6, loop 5 being automatically maintained oriented with respect to the transmitter 2 at the point A in response to energy received therefrom and loop 6 being automatically maintained oriented with respect to the transmitter 3 at the point B likewise in response to energy received from the latter transmitter. As stated above the angle between the course and the line AY is represented by M; likewise the angle between the course and the line BY is represented by the angle N. It will be understood that as the craft travels on its course and the angles M and N continuously change, the angles made by the loops 5 and 6 also continuously change, the angles of the loops 5 and 6 serving as a measure of the angles M and N respectively.

The craft also is provided with a compass, such for example as a magneto compass, represented at 8 in Fig. 2 and this compass is provided with suitable means such as that disclosed in the Becker Patent 1,991,443, February 14, 1935, for maintaining the pole pieces thereof in an east and west position in response to the voltage produced in the armature when the pole pieces are deflected from that position. This apparatus is represented in its entirety by the rectangle 9 which connects through the gearing 10 and the shaft 11 with the pole piece mounting of the compass. The means by which the loops 5 and 6 are maintained oriented with respect to the transmitters 2 and 3 respectively are like that disclosed in the above-mentioned patent for steering the craft and such means are represented respectively by the rectangles 12 and 13. These means, it will be understood operate directly on the shafts carrying the loops 5 and 6 in place of the cord and pulley 50 of the aforesaid patent.

I shall now describe specifically one form of apparatus into which the above-mentioned known fixed quantities may be initially set and into which the changing quantities may be continuously fed which apparatus may be used for continuously solving Equation 12. I shall also describe a form of apparatus for automatically effecting the steering of the craft to maintain it on the course in accordance with the solving of that equation. In addition I shall describe a form of apparatus for indicating the distance traversed by the craft and the speed thereof, such apparatus being disclosed and claimed in the Albert L. Ruiz Patent 2,066,949, January 5, 1938.

The apparatus comprises in part three similar mechanisms I, II, and III constructed and connected to compute the first, second, and third terms respectively of Equation 12. The respective mechanisms include slotted pivoted arms 16, 16', and 16" having at their outer ends the gear segments 17, 17', and 17" by which the arms are rotated, these gear segments being in mesh with pinions 18, 18', and 18". Intersecting the arms are the slotted horizontal slides 19, 19', and 19" which are arranged to move in a vertical direction only and which are threaded on the screws 20, 20', and 20" by which they are moved. Also intersecting with the arms are the slotted vertical slides 21, 21', and 21" which are arranged to move in a horizontal direction only and which have portions forming racks 22, 22', and 22" which engage the gears 23, 23', and 23". The arm and the two slides are caused to intersect at a common point by the pin 24, 24', and 24". It will be seen that with this construction if an arm is moved to a given position and the horizontal slide is moved to a given position, the vertical slide must assume a position which is a function of the positions of the other two members.

The known angle C is initially set into mechanism I by rotating the crank 26 which connects through the gearing 27 with the gear 18 and with the angle indicator 28 until the desired angle is shown by the indicator. The arm 16 of mechanism I is thereby set at the desired angle C.

The distance $m$ is set into mechanism I by rotating the crank 30 which connects through the gearing 31 with the indicator 32 and through the differential gear 33 with the shaft 20. The resulting rotation of the screw 20 moves the slide 19 to a position in accordance with the movement of the crank 30 as indicated by the indicator 32. Distance $n$ is also set into the mechanism by rotating the crank 35 which through the gearing 36 operates the indicator 37 and through the shaft 38, the spur gearing 39 and the differential gear 33 also turns the screw 20 in the same direction as before so as to move the slide 19 an additional amount in accordance with the distance $n$ as indicated by the indicator 37. It will be readily seen that since the position of the arm 16 represents the angle C and the position of the slide 19 represents the distances $m$ plus $n$, the position of the slide 21 will represent the product of $m$ plus $n$ and the cotangent of the angle C. Thus the resulting movement of the gear 23 is proportional to $(m+n)$ cot $C$ which is the first term of Equation 12.

Referring now to mechanism II, the loop 5 will have been moved by the orienting means 12 through the angle between the craft axis and the line connecting the craft with the point A. Through the operation of the magneto compass 8 the angle of the craft axis with respect to north is added to the above-mentioned angle by means of the differential gear 40, the sum being equal to the angle M'. By turning the crank 44 the proper amount as shown by the indicator 45 the magnetic bearing of the course, namely angle J, is set into the mechanism. This angle J is subtracted from angle M' by the differential gear 41 the difference $M'-J$ which is the same as $180°-M$ being transmitted to segment 17' through the shaft 42, clutch 43 and pinion 18'. Thus the angle of arm 16' is equal to $180°-M$.

The distance $m$ is set into mechanism II through the shaft 47 which through the gearing 48 rotates the screw 20' to move the slide 19'. Since the angle of the arm 16' is equal to $180°-M$ and the position of the slide 19' represents the distance $m$, the position of the slide 21' will represent the product of $m$ and the minus cotangent of M. Thus the resulting movement of the gear 23' is proportional to $-m$ cot $M$ which is the second term of Equation 12.

Referring now to mechanism III, the loop 6 will have been moved by the orienting means 13 through the angle between the craft axis and the line connecting the craft with the point B. Through the operation of the magneto compass 8 the angle of the craft axis with respect to north is subtracted from the above-mentioned angle by means of the differential gear 50, the difference being equal to the angle N'. The magnetic bearing of the course having already been set in the apparatus by turning the crank 44 the angle J is added to the angle N' by the differential gear 51, the sum $N'+J$ which is the same as $180°-N$ being transmitted to segment 17'' through the shaft 52, clutch 53 and pinion 18''. Thus the angle of the arm 16'' is equal to $180°-N$.

The distance $n$ is set into mechanism III through the shaft 54 which through the gearing 55 rotates the screw 20'' to move the slide 19''. Since the angle of the arm 16'' is equal to $180°-N$ and the position of the slide 19'' represents the distance $n$, the position of the slide 21'' will represent the product of $n$ and the minus cotangent of N. Thus the resulting movement of the gear 23'' is proportional to $-n$ cot $N$ which is the negative of the third term of Equation 12.

By means of the shaft 56 and the differential gear 57 the movement of gear 23 of mechanism I is added to that of gear 23' of mechanism II. Likewise by means of the shaft 58 and the differential gear 59, from the sum of the movements of gears 23 and 23' is subtracted the movement of gear 23'' of mechanism III. The final algebraic sum is transmitted through the gearing 60 to the dial 61 of the course indicator having the fixed pointer 62. If the craft is on the course the zero mark of the dial 61 will stand opposite the pointer 62 and thus indicate to the pilot that the craft is traveling on the course. If on the other hand the zero mark is at either side of the pointer, the pilot knows that the craft has deviated from the course, the direction and the amount of the deviation being indicated by the dial. With that information he may turn the rudder to bring the craft back on the course.

The craft may be steered automatically to keep it on the course by controlling the rudder in accordance with the angular position of the dial 61. The means which I have illustrated for so moving the rudder is to a certain extent like that disclosed in the above-mentioned Patent 1,991,443. In the present case the rudder 65 is connected by the cables 66 with the gear 67 which is arranged to be moved in one direction or the other from the midposition illustrated by the reversible motor 68. The direction of rotation of this motor is controlled by the relay 69 having the two windings 70 and 71 which are connected to be energized by the battery 72 under the control of the discharge devices 73 and 74 respectively. These devices in turn are controlled by the polarized relay 75 in a manner similar to that of the polarized relay 20 and discharge devices 21 and 22 of the above-mentioned patent. The winding of the polarized relay 75 is arranged to be energized by current in one direction or the other in accordance with the position of the contact 76 secured to the scale 61 and arranged to move over the resistor 77. This resistor has its ends connected with the ends of a similar resistor 78 and with the ends of the battery 79. The contact 80 carried by the gear 67 and connected with the winding of the polarized relay engages the resistor 78. By this arrangement it will be seen that as long as the craft is on the course no current is supplied to the polarized relay 75. If, however, the course indicator shows a deviation of the craft to one side the movement of the contact 76 supplies current in a direction to energize relay 75 which through one or the other of the discharge tubes energizes the relay 69 in a direction to cause the motor to turn the gear 67 so as to change the position of the rudder to correct the deviation. The rheostat 78 and contact 80 constitute a follow up arrangement whereby the operation of the motor 68 operates to turn the craft through successive increments until it has reached the final position in the same manner and for the same purpose as described in the aforementioned patent. By means of the apparatus thus described the craft may be steered automatically in response to the initial setting into the apparatus of the known quantities and the continued feeding into the apparatus of the changing quantities so that the craft will be kept on the predetermined course regardless of the effect of side winds, etc.

Equation 7 obviously may be written $$D = m \sin (C-M) \csc M \qquad (13)$$

I shall now describe apparatus operated by the above-described apparatus by which the distance traveled by the craft and the speed thereof may be indicated. Mechanism designated IV comprises the gear 85 mounted on the pin 86 and having a slot 87 therein forming a cosecant cam. This gear is connected through the shaft 88 and gears thereon with the crank 26 associated with the indicator of angle C whereby when angle C is set into the apparatus the gear and cosecant cam is rotated through an angle equal to C. Mounted concentrically with the gear 85 is the outer gear 89 which has the slotted radial arm 90. This gear 89 is rotated in the same direction as the inner gear through an angle equal to the angle C minus the angle M by means of the differential gear 91 since by this differential gear and the spur gearing 92 the movement of shaft 42 is subtracted from that of shaft 88. This differential movement is transmitted through the gearing 93 to the outer gear 89. The relative movement between the inner and outer gears is $C-(C-M)$ which equals M. Arranged for vertical movement between two suitable guide surfaces is the slotted horizontal bar 95 and this bar, the arm 90 and the face of the cosecant cam are caused to intersect at a common point by the pin 96. Inasmuch as the relative movement between gears 85 and 89 is proportional to angle M, the distance between pins 96 and 86 is equal to the cosecant of M. Also since the gear 89 has been moved through angle $C-M$ the vertical displacement of the pin 96 and hence of the bar 95 is equal to $\sin (C-M) \csc M$.

Bar 95 being common to mechanisms IV and V, the vertical movement of this bar is communicated to mechanism V. In this mechanism the slotted link 98 is pivoted to the fixed pivot 99 adjacent one end and at the opposite end is pivoted to the nut 100 which is threaded on the screw 101. This screw connects through the gearing 102 with the screw 20' of mechanism II. By this means the distance $m$ is transmitted to the upper end of the link 98. The slide 103 which is similar to slide 21, intersects the bar 95 and the link 98, the pin 104 causing the three members to intersect at a common point. By the mechanism V the vertical displacement of the bar 95 is combined with the quantity $m$ whereby the horizontal displacement of the slide 103 is equal to $m \sin (C-M) \csc M$ which according to Equation 13 equals the distance traversed by the craft. Movement of the slide 103 may be communicated through gearing such as 105 to the odometer 106 which if desired may be calibrated to read in miles.

Inasmuch as the loops 5 and 6 do not necessarily follow the changing positions of the transmitters 2 and 3 to which they are responsive with steady movements but may follow them rather by series of small increments, the movement of the slide 103 accordingly may be intermittent. The average rate of movement of the slide 103 is a measure of the speed of the craft and in order that I may employ a speedometer of a common form, such as for example as that shown at 107, for indicating the speed of the craft suitable means are provided for reducing the intermittent motion to a steady movement. Such means I have represented as comprising a well known form of overrunning clutch 108 between which and the speedometer is the flywheel 109.

If the course to be traveled is such that it passes through one of the transmitters, for example, the transmitter 3 at the point B, then the angle N will be zero as long as the craft is on the course. In this case for course indication and automatic steering transmitter 2 and the receiver including loop 5 are not necessary, hence clutches 43 and 53 should be disconnected and quantity $n$ should be set at zero. The clutch 112 will be closed thereby establishing a direct connection between the shaft 52 and the indicator through the shaft 113 and gearing 114, the mechanisms II and III now being inoperative. Thus any change in angle of loop 6 resulting from a deviation of the craft from the course will be indicated by the indicator 61 as before. The distance traveled and the speed of the craft are obtained by mechanisms IV and V as a result of the changing angle M in the manner already described above.

While for convenience in this disclosure I have shown and referred to radio transmitters, radio receivers, directive antennae in the form of loops and a magnetic compass, it will be understood that this is merely for the purpose of illustration and that I do not wish the scope of my invention to be confined to such elements. I may wish to employ a radiant energy transmitter which will emit extremely short waves having the characteristics of light waves, infra red waves, heat waves or light waves. I may also employ receiving means including photoelectric devices or thermoelectric devices. Moreover I may employ directive antennae of other types and may employ a compass of any other well known and suitable type. In the drawing I have not attempted to show the various parts of the apparatus in their true relative proportions nor have I attempted in all cases to show the gears arranged for rotation in the proper direction or having the proper gear ratio.

I have chosen the particular embodiment described above as illustrative of my invention and it will be apparent that various modifications may be made without departing from the spirit and scope of my invention which modifications I aim to cover by the appended claims.

What I claim as new and desire to secure by Letters Patent of the United States, is:

1. A system for steering a moving craft on a straight course comprising means for producing radiant energy at a plurality of points positioned laterally of said course, the angle between the course and the line connecting the points and the distances of the points from the course measured on the line being known, means on said craft for receiving said energy including a plurality of receptors each arranged to be maintained oriented with respect to one of said points, means for setting into said system quantities corresponding with said known angle and distances and means operative in response to said quantities and to the angles between the course and said receptors to indicate whether or not the craft is on the course.

2. A system for steering a moving craft on a straight course comprising means for transmitting radiant energy from a plurality of points positioned laterally of said course, the angle between the course and the line connecting the points and the distances of the points from the course measured on the line being known, means on said craft for receiving said energy including a plurality of receptors each provided with means for maintaining it oriented with respect to one of said points, separate means operative to set into said system quantities corresponding with said known angle and each of said distances and means operative in response to said quantities and to the angles between the course and said receptors to indicate whether or not the craft is on the course.

3. A system for steering a moving craft on a straight course comprising means for producing radiant energy at a plurality of points positioned laterally of said course, the distances between the points and the course measured along the line connecting the points being equal to $m$ and $n$ and the angle between said line and the course being equal to C, means on said craft for receiving said energy including a plurality of receptors each arranged to be maintained oriented with respect to one of said points and making angles with the course equal respectively to M and N, the relation of said distances and said angles when the craft is on the course being expressed by the equation:

$$(m+n) \cot C - m \cot M + n \cot N = 0,$$

and means responsive to said known angle and distances and to the angles made by said receptors for indicating whether or not the equation is satisfied.

4. A system for steering a moving craft on a straight course comprising means for producing radiant energy at a plurality of points positioned laterally of said course, the distances between the points and the course measured along the line connecting the points being equal to $m$ and $n$ and the angle between said line and the course being equal to C, means on said craft for receiving said energy including a plurality of receptors each arranged to be maintained oriented with respect to one of said points and making angles with the course equal respectively to M and N, the relation of said distances and said angles when the craft is on the course being expressed by the equation:

$$(m+n) \cot C - m \cot M + n \cot N = 0,$$

means responsive to said known angle and distances and to the position of said receptors for continuously solving said equation and an apparatus responsive to the satisfying of said equation.

5. A system for guiding a moving craft in a straight course comprising a plurality of radio transmitters operating at different frequencies and spaced laterally of said course, the distances between said transmitters and said course measured along the line connecting the transmitters being equal to $m$ and $n$ and the angle between said line and said course being equal to C, a plurality of radio receivers on said craft, each receiver being provided with a directive receptor having means for automatically maintaining it oriented with respect to one of said transmitters in response to energy received therefrom, the receptors making angles with the course equal to M and N and the relation of said distances and said angles when the craft is on said course being expressed by the equation:

$$(m+n) \cot C - m \cot M + n \cot N = 0,$$

means responsive to said known angle and distances and to the position of said receptors for continuously solving said equation and means indicating when said equation is satisfied.

6. A system for steering a moving craft in a straight course comprising a plurality of radio transmitters operating at different frequencies and spaced laterally of said course, the angle between said course and the line joining said transmitters being known and equal to C, the distances of said transmitters from the course measured on said line being known and equal to $m$ and $n$ respectively, a plurality of radio receivers on said craft, each receiver being tuned to the frequency of one of said transmitters and provided with a directive antenna having means by which it may be maintained oriented with respect to the transmitter to which it is tuned in accordance with the energy received therefrom, the changing angles between the course and the respective antenna being equal to M and N, the relation of said quantities when the craft is on said course being expressed by the equation:

$$(m+n) \cot C - m \cot M + n \cot N = 0,$$

a computing mechanism provided with a dial and carried by the craft for solving said equation, means for setting said known quantities into said mechanism and means for continuously feeding said changing angles into said mechanism, said dial indicating whether or not said equation is satisfied.

7. A system for steering a moving craft in a straight course comprising a plurality of radio transmitters operating at different frequencies and spaced laterally of said course, the angle between said course and the line joining said transmitters being known and equal to C, the distances of said transmitters from the course measured on said line being known and equal to $m$ and $n$ respectively, a plurality of radio receivers on said craft, each receiver being tuned to the frequency of one of said transmitters and provided with a directive antenna having means by which it may be maintained oriented with respect to the transmitter to which it is tuned in accordance with the energy received therefrom, the changing angles between the course and the respective antennae being equal to M and N, the relation of said quantities when the craft is on said course being expressed by the equation:

$$(m+n) \cot C - m \cot M + n \cot N = 0,$$

a computing mechanism carried by the craft for continuously solving said equation, means for setting said known quantities into said mechanism, means for continuously feeding said changing angles into said mechanism and steering mechanism for said craft responsive to the output of said computing mechanism.

8. A system for steering a moving craft on a straight course comprising means for producing radiant energy at a plurality of points positioned laterally of said course, the angle between the course and the line connecting the points and the distances of the points from the course measured on the line being known, means on said craft for receiving said energy including a plurality of receptors each arranged to be maintained oriented with respect to one of said points, means for setting into said system quantities corresponding with said known angle and distances, means operative in response to said quantities and to the angles between the course and said receptors to indicate whether or not the craft is on the course and means responsive to the angle between the course and one of said receptors for indicating the distance traveled.

9. A system for steering a moving craft on a straight course comprising means for producing radiant energy at a plurality of points positioned laterally of said course, the angle between the course and the line connecting the points and the distances of the points from the course measured on the line being known, means on said craft for receiving said energy including a plurality of receptors each arranged to be maintained oriented with respect to one of said points, means for setting into said system quantities corresponding with said known angle and distances, means operative in response to said quantities and to the angles between the course and said receptors to indicate whether or not the craft is on the course, and means responsive to the changing angle between the course and one of said receptors for indicating the speed of the craft.

10. A system for steering a moving craft on a straight course comprising means for producing radiant energy at a plurality of points positioned laterally of said course, the angle between the course and the line connecting the points and the distances of the points from the course measured on the line being known, means on said craft for receiving said energy including a plurality of receptors each arranged to be maintained oriented with respect to one of said points, means for setting into said system quantities corresponding with said known angle and distances, means operative in response to said quantities and to the angles between the course and said receptors to steer the craft to keep it on the course, and means responsive to the changing angle between the course and one of said receptors for indicating the distance traveled.

11. A system for steering a moving craft on a straight course comprising means for producing radiant energy at a plurality of points positioned laterally of said course, the angle between the course and the line connecting the points and the distances of the points from the course measured on the line being known, means on said craft for receiving said energy including a plurality of receptors each arranged to be maintained oriented with respect to one of said points, means for setting into said system quantities corresponding with said known angle and distances, means operative in response to said quantities and to the angles between the course and said receptors to steer the craft to keep it on the course, and means responsive to the changing angle between the course and one of said receptors for indicating the speed of the craft.

EARL E. LIBMAN.